(12) United States Patent
Shoji

(10) Patent No.: US 6,787,790 B2
(45) Date of Patent: Sep. 7, 2004

(54) IMAGE INFORMATION READ-OUT APPARATUS

(75) Inventor: Takashi Shoji, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 395 days.

(21) Appl. No.: 09/839,175

(22) Filed: Apr. 23, 2001

(65) Prior Publication Data
US 2001/0048085 A1 Dec. 6, 2001

(30) Foreign Application Priority Data

Apr. 24, 2000 (JP) ........................................ 2000-122766

(51) Int. Cl.[7] .............................................. G03B 42/02
(52) U.S. Cl. .......................... 250/585; 250/584; 250/591
(58) Field of Search ............................... 200/584, 585, 200/591

(56) References Cited

U.S. PATENT DOCUMENTS 6,310,358 B1 * 10/2001 Zur ............................. 250/591

FOREIGN PATENT DOCUMENTS

| EP | 0 898 421 A2 | 2/1999 |
| EP | 0 989 730 A2 | 3/2000 |
| EP | 1 041 400 A2 | 10/2000 |
| JP | 10-232824 | 9/1998 |
| JP | 10-271374 | 10/1998 |
| JP | 11-87922 | 3/1999 |
| JP | 2000-105297 | 4/2000 |
| JP | 2000-162726 | 6/2000 |
| JP | 2000-284056 | 10/2000 |

* cited by examiner

Primary Examiner—Constantine Hannaher
Assistant Examiner—Shun Lee
(74) Attorney, Agent, or Firm—Sughrue Mion, PLLC

(57) ABSTRACT

An image information read-out apparatus includes an image read-out system which is provided with a line reading light source for scanning a recording medium with a line reading light beam and reads out image information from the recording medium in response to the line reading light source scanning the recording medium, and an image read-out system moving mechanism which moves the image read-out system inclusive of the recording medium and the line reading light source. A scanning detecting system detects that the line reading light source is scanning the recording medium with the line reading light beam, and an alarm informs the operator that the line reading light source is scanning the recording medium with the line reading light beam when the scanning detecting system detects the fact.

27 Claims, 8 Drawing Sheets

F I G . 2
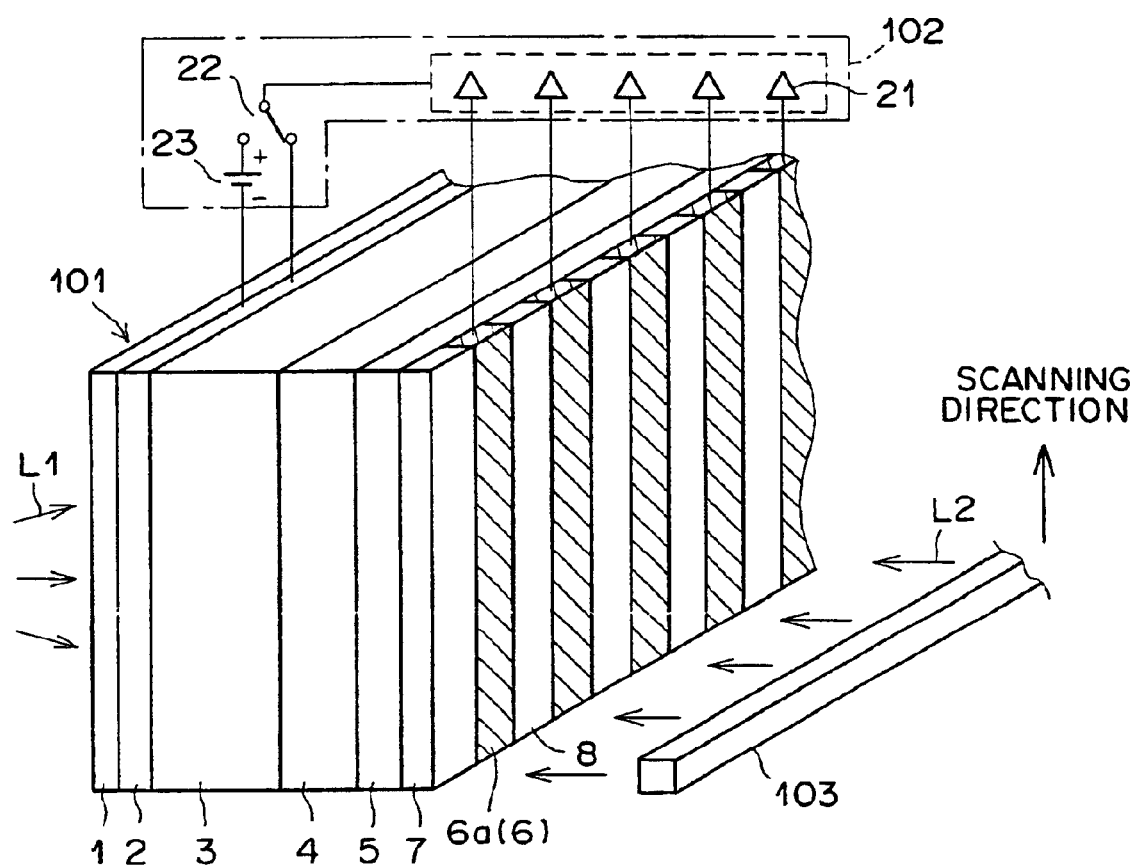

F i G . 5
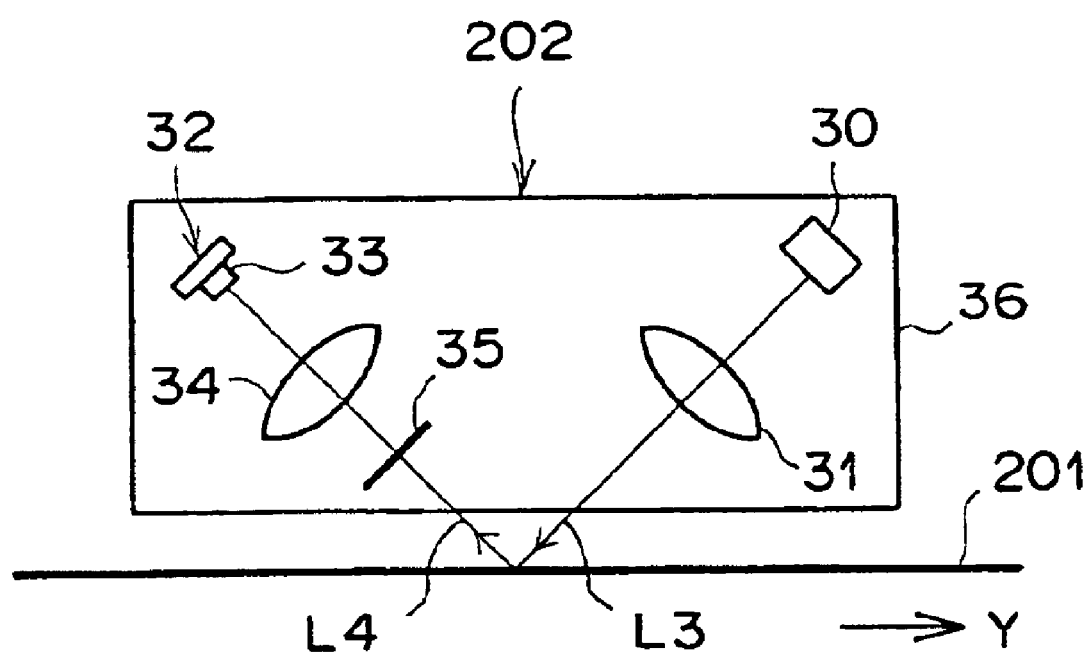

F I G. 6
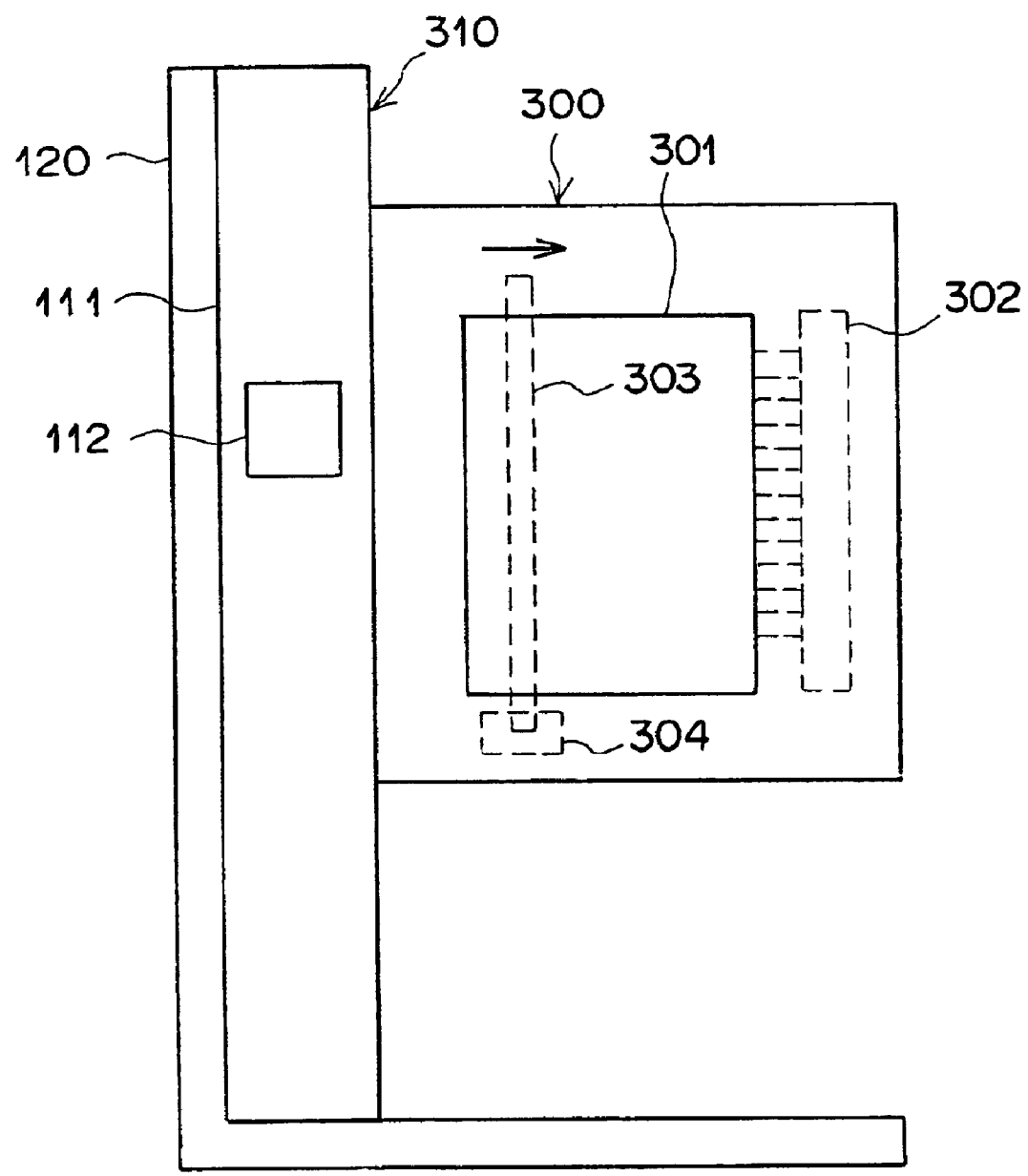

IMAGE INFORMATION READ-OUT APPARATUS

BACKGROUND OF THE INVENTION

1. Field of the Invention

This invention relates to an image information read-out apparatus which reads out image information from a recording medium by scanning the recording medium with reading light, and more particularly to an image information read-out apparatus in which the reading light is in the form of a line beam.

2. Description of the Related Art

An image information read-out apparatus which reads out image information from a recording medium by scanning the recording medium with a reading light beam has been used in a facsimile, a copier, a radiation image recording and read-out apparatus and the like. For example, in the field of medical radiography, there has been known a method in which an electrostatic recording medium such as plates or sheets having a photoconductive layer sensitive to radiations such as X-rays (e.g., a selenium plate) is used as an image recording medium, the electrostatic recording medium is exposed to X-rays passing through an object to store a latent radiation image of the object as latent image charges accumulated in respective parts of the recording medium according to the amount of X-rays impinging upon the parts, and the electrostatic recording medium is scanned with a reading light beam to read out the latent radiation image stored thereon. For example, see our Japanese Patent Application Nos. 10(1998)-232824, 10(1998)-271374 and 11(1999)-87922.

When certain kinds of phosphors are exposed to a radiation such as X-rays, α-rays, β-rays, γ-rays, cathode rays or ultraviolet rays, they store a part of the radiation. Then when the phosphor which has been exposed to the radiation is exposed to stimulating rays such as visible light, light is emitted from the phosphor in proportion to the stored energy of the radiation. A phosphor exhibiting such properties is generally referred to as "a stimulable phosphor". A radiation image recording and read-out apparatus using a sheet having a layer of stimulable phosphor (generally referred to as a "stimulable phosphor sheet") has been put into practice. In the radiation image recording and read-out apparatus, the stimulable phosphor sheet is first exposed to a radiation passing through an object and stores a radiation image of the object and the stimulable phosphor sheet is scanned with a reading light beam (a stimulating light beam) and light emitted from the stimulable phosphor upon exposure to the stimulating light beam is detected to read out the radiation image of the object. In this specification, the light emitted from the stimulable phosphor upon exposure to the stimulating light will be referred to as "stimulated emission".

In the image information read-out apparatus where an image recorded on a recording medium (e.g., an electrostatic recording medium, a stimulable phosphor sheet and the like) is read out by exposing the recording medium to reading light, the recording medium is often exposed to the reading light by sweeping a line reading light beam emitted from a line light source such as an LED array or an LD array in a direction intersecting the direction of the line reading light beam.

When the image information read-out apparatus is for medical radiography, the recording/read-out unit carrying thereon a recording medium and a line reading light source must be moved according to the height of the object, a picture taking angle and/or the like. Accordingly, the image information read-out apparatus is sometimes provided with a recording/read-out unit moving means.

However, when the recording/read-out unit moving means moves the recording/read-out unit while the line reading light source is scanning the recording medium with a line reading light beam, a certain physical force sometimes acts on the line reading light source in the direction of scanning of the line reading light beam. As a result, the reading light beam scanning speed of the line reading light source fluctuates and the reading light beam can impinge upon the recording medium in wrong positions, which can result in generation of artifact in the image information read out.

SUMMARY OF THE INVENTION

In view of the foregoing observations and description, the primary object of the present invention is to provide an image information read-out apparatus having a read-out means and a moving means for moving the read-out means in which generation of artifact due to movement of the read-out means is prevented, whereby image information excellent in S/N ratio can be obtained.

In accordance with a first aspect of the present invention, there is provided an image information read-out apparatus comprising an image read-out means which is provided with a line reading light source for scanning a recording medium with a line reading light beam and reads out image information from the recording medium in response to the line reading light source scanning the recording medium, and an image read-out means moving means which moves the image read-out means inclusive of the recording medium and the line reading light source, wherein the improvement comprises that a scanning detecting means which detects that the line reading light source is scanning the recording medium with the line reading light beam, and an alarm means which informs the operator that the line reading light source is scanning the recording medium with the line reading light beam when the scanning detecting means detects the fact.

The alarm means may comprise, for instance, an alarm buzzer or an alarm lamp.

In accordance with a second aspect of the present invention, there is provided an image information read-out apparatus comprising an image read-out means which is provided with a line reading light source for scanning a recording medium with a line reading light beam and reads out image information from the recording medium in response to the line reading light source scanning the recording medium, and an image read-out means moving means which moves the image read-out means inclusive of the recording medium and the line reading light source, wherein the improvement comprises a scanning detecting means which detects that the line reading light source is scanning the recording medium with the line reading light beam, and a movement inhibiting means which inhibits the image read-out means moving means from moving the read-out means when the scanning detecting means detects that the line reading light source is scanning the recording medium with the line reading light beam.

The movement inhibiting means may electrically inhibit movement of the read-out means by the use of, for instance, a relay which cuts an electrical signal directing movement of the read-out means or mechanically inhibit movement of the read-out means by the use of, for instance, a brake mechanism or a clutch mechanism.

In accordance with a third aspect of the present invention, there is provided an image information read-out apparatus comprising an image read-out means which is provided with a line reading light source for scanning a recording medium with a line reading light beam and reads out image information from the recording medium in response to the line reading out scanning the recording medium, and an image read-out means moving means which moves in a predetermined direction the image read-out means inclusive of the recording medium and the line reading light source, wherein the improvement comprises that the line reading light source scans the recording medium with the line reading light beam in a direction substantially perpendicular to said predetermined direction in which the image read-out means moving means moves the image read-out means.

In accordance with a fourth aspect of the present invention, there is provided an image information read-out apparatus comprising an image read-out means which is provided with a line reading light source for scanning a recording medium with a line reading light beam and reads out image information from the recording medium in response to the line reading out scanning the recording medium, and an image read-out means moving means which moves the image read-out means inclusive of the recording medium and the line reading light source, wherein the improvement comprises a scanning detecting means which detects that the line reading light source is scanning the recording medium with the line reading light beam, and a movement direction limiting means which limits the direction of movement of the image read-out means by the image read-out means moving means to directions substantially perpendicular to the direction in which the line reading light source scans the recording medium with the line reading light beam when the scanning detecting means detects that the line reading light source is scanning the recording medium with the line reading light beam.

In accordance with a fifth aspect of the present invention, there is provided an image information read-out apparatus comprising an image read-out means which is provided with a line reading light source for scanning a recording medium with a line reading light beam and reads out image information from the recording medium in response to the line reading out scanning the recording medium, and an image read-out means moving means which moves the image read-out means inclusive of the recording medium and the line reading light source, wherein the improvement comprises a scanning detecting means which detects that the line reading light source is scanning the recording medium with the line reading light beam, and a movement limiting means which limits, when the scanning detecting means detects that the line reading light source is scanning the recording medium with the line reading light beam, the direction of movement and/or the acceleration of movement of the image read-out means by the image read-out means moving means so that force F acting on the line reading light source in the direction of scanning of the recording medium with the line reading light beam becomes not larger than 10 $Kgm/s^2$, wherein the force F is represented by the product of a mass $m$ of the line reading light source and an acceleration $a$ acting in the direction of scanning of the recording medium with the line reading light beam.

The "mass $m$ of the line reading light source" is the total mass of the components which are moved integrally with the line reading light source to scan the recording medium with the line reading light beam, and the "force F acting on the line reading light source in the direction of scanning of the recording medium with the line reading light beam" is a force acting on the line reading light source in the direction of scanning of the recording medium with the line reading light beam out of forces acting on the line reading light source when the image read-out means is moved by the image read-out means moving means.

Preferably, the movement limiting means limits, when the scanning detecting means detects that the line reading light source is scanning the recording medium with the line reading light beam, the direction of movement and/or the acceleration of movement of the read-out means by the image read-out means moving means so that force F acting on the line reading light source in the direction of scanning of the recording medium with the line reading light beam becomes not larger than 3 $Kgm/s^2$.

Preferably the recording medium is an electrostatic recording medium having at least one photoconductive material layer. The recording medium may be those having a stimulable phosphor layer.

The line reading light source may comprise, for instance, a plurality of LED chips or LD chips arranged in at least one row, or at least one LED array or LD array.

Preferably, the line reading light source is not larger than 1 Kg in mass $m$.

In accordance with the first aspect of the present invention, the alarm means informs the operator that the line reading light source is scanning the recording medium with the line reading light beam when the scanning detecting means detects the fact. Accordingly, the operator can prevent generation of artifact by holding stationary the image read-out means or by moving the image read-out means in a direction or at an acceleration which does not adversely affect scanning of the recording medium with the line reading light beam when the scanning detecting means detects that the line reading light source is scanning the recording medium with the line reading light beam.

In accordance with the second aspect of the present invention, the movement inhibiting means inhibits the image read-out means moving means from moving the read-out means when the scanning detecting means detects that the line reading light source is scanning the recording medium with the line reading light beam. Accordingly, the reading light beam scanning speed of the line reading light source can be fixed to a predetermined speed, whereby generation of artifact in the image information can be prevented.

In accordance with the third aspect of the present invention, the line reading light source scans the recording medium with the line reading light beam in a direction substantially perpendicular to said predetermined direction in which the image read-out means moving means moves the image read-out means, whereby movement of the image read-out means by the image read-out means moving means does not hardly include a disturbing component which can adversely affect the scanning of the recording medium with the line reading light beam. As a result, setting for another shot can be carried out while the image read-out means is reading out an image, whereby the effective time required for one shot can be shortened, the load on both the operator and the object can be lightened and the working efficiency of the image read-out apparatus can be increased.

In accordance with the fourth aspect of the present invention, the image read-out means may be moved in a direction substantially perpendicular to the direction in which the line reading light source scans the recording medium with the line reading light beam without fear of generating artifact even when the scanning detecting means detects that the line reading light source is scanning the recording medium with the line reading light beam. As a result, setting for another shot can be partly carried out while the image read-out means is reading out an image, whereby the effective time required for one shot can be shortened, the load on both the operator and the object can be lightened and the working efficiency of the image read-out apparatus can be increased.

In accordance with the fifth aspect of the present invention, when the scanning detecting means detects that the line reading light source is scanning the recording medium with the line reading light beam, the direction of movement and/or the acceleration of movement of the image read-out means by the image read-out means moving means is limited so that force F acting on the line reading light source in the direction of scanning of the recording medium with the line reading light beam becomes not larger than 10 $Kgm/s^2$. Accordingly, no large force acts in the scanning direction of the recording medium with the line reading light beam, and the reading light beam scanning speed of the line reading light source can be fixed to a predetermined speed, whereby generation of artifact in the image information can be prevented. As a result, setting for another shot can be carried out while the image read-out means is reading out an image though somewhat limited, whereby the effective time required for one shot can be shortened and at the same time, generation of artifact in the image information can be prevented.

When the movement limiting means limits, when the scanning detecting means detects that the line reading light source is scanning the recording medium with the line reading light beam, the direction of movement and/or the acceleration of movement of the read-out means by the image read-out means moving means so that force F acting on the line reading light source in the direction of scanning of the recording medium with the line reading light beam becomes not larger than 3 $Kgm/s^2$, generation of artifact can be more surely prevented and the reliability of the image information read-out apparatus can be improved.

Further when the recording medium is an electrostatic recording medium having at least one photoconductive material layer, image information can be recorded as a pattern of electrostatic charges, and the image information can be easily read out by exposing the recording medium to the reading light.

Further when the recording medium is one having a stimulable phosphor layer, the image information can be easily read out as a pattern of fluorescence emitted from the recording medium upon exposure to the reading light.

When the line reading light source comprises a plurality of LED chips or LD chips arranged in at least one row, the chips can be replaced chip by chip in the case of failure, which reduces the maintenance cost.

When the line reading light source comprises at least one LED array or LD array, the line reading light source can be less expensive and small in size.

When the line reading light source is not larger than 1 Kg in mass $\underline{m}$, the force F acting on the line reading light source in the direction of scanning of the recording medium with the line reading light beam becomes sufficiently small, and limitation on the movement of the image read-out means is lightened and setting for another shot can be carried out more easily.

BRIEF DESCRIPTION OF THE DRAWINGS

FIG. 2 is a fragmentary perspective view of the electrostatic recording medium and the recording/read-out section of the radiation image information recording and read-out apparatus, FIG. 5 is a schematic view showing the line reading light source and the sensor portion, FIG. 6 is a radiation image information recording and read-out apparatus in accordance with a third embodiment of the present invention.

DESCRIPTION OF THE PREFERRED EMBODIMENTS

Figure 1:
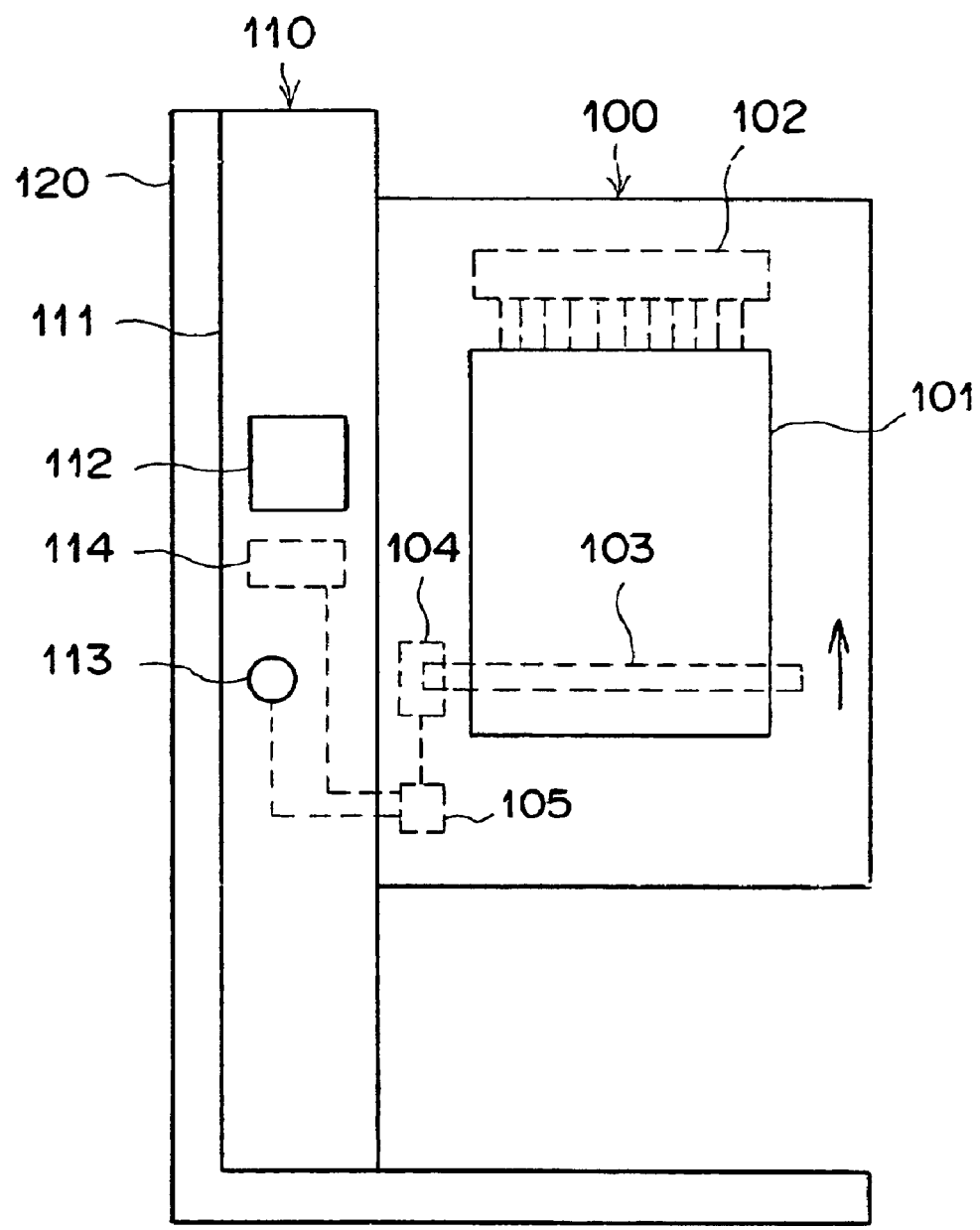
FIG. 1 is a radiation image information recording and read-out apparatus in accordance with a first embodiment of the present invention.

In FIG. 1, a radiation image information recording and read-out apparatus in accordance with a first embodiment of the present invention is for chest radiography and comprises a recording/read-out section 100 (as the image read-out means), a moving section 110, a stand 120 and an x-ray projecting section (not shown). The recording/read-out section 100 is mounted on the stand 120 by way of the moving section 110 to be movable up and down along the stand 120. The operator adjusts the level of the recording/read-out section 100 to conform to the level of the chest of the object.

The recording/read-out section 100 comprises an electrostatic recording medium 101 in the form of a flat panel, a current detecting section 102 which reads out image information as an electric current pattern, an LED array 103 which emits a line reading light beam, a scanning section 104 which moves the LED array 103 in the direction of the arrow substantially perpendicular to the longitudinal direction of the LED array 103, thereby two-dimensionally exposing the electrostatic recording medium 101 to the line reading light beam, and a scanning detecting means 105.

The moving section 110 comprises a moving mechanism 111 formed by a screw rod extending in the vertical direction, an electric motor which drives the screw rod and an internal thread member in mesh with the screw rod, a control section 112, a buzzer 113 (alarm means) which informs the operator that the LED array 103 is scanning the electrostatic recording medium 101 with the line reading light beam, and a movement inhibiting means 114 which inhibits movement of the recording/read-out section 100. An alarm lamp may be used in place of the buzzer 113.

According to the setting effected by the operator through the control section 112, the electric motor of the moving mechanism 111 rotates the screw rod to move up and down the recording/read-out section 100 connected to the internal thread member.

Figure 3:
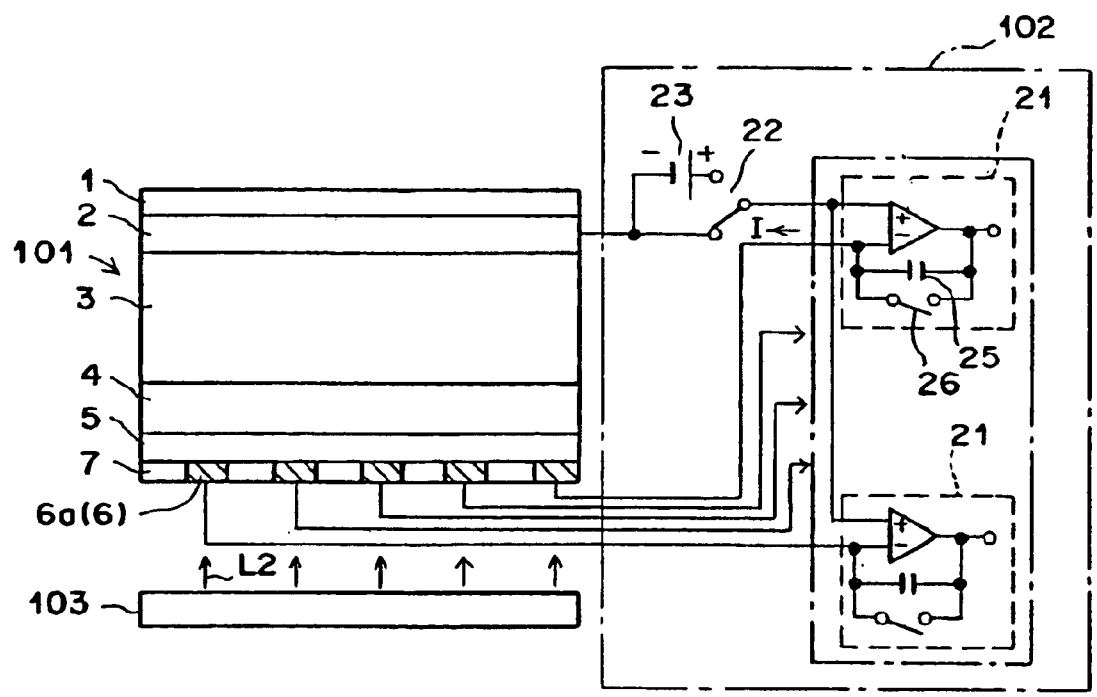
FIG. 3 is a fragmentary plan view of the electrostatic recording medium and the recording/read-out section of the radiation image information recording and read-out apparatus.

The electrostatic recording medium 101 and the current detecting section 102 will be described in detail with reference to FIGS. 2 and 3, hereinbelow. The electrostatic recording medium 101 comprises a wavelength conversion layer (an X-ray scintillator) 1 which converts X-rays L1 (recording radiation) into light in a different wavelength range (e.g., blue light), a first electrode layer 2 permeable to blue light, a recording photoconductive layer 3 which exhibits conductivity upon exposure to blue light passing through the first electrode layer 2, a charge transfer layer 4 which behaves like a substantially insulating material to an electric charge of a latent image polarity at which the first electrode layer 2 is electrified and behaves like a substantially conductive material to the electric charge of a transfer polarity opposite to the latent image polarity, a reading photoconductive layer 5 which exhibits conductivity upon exposure to reading light L2 and a second electrode layer 7 which are superposed one on another in this order. The second electrode layer 7 comprises stripe electrode 6 formed by a number of electrode elements 6a arranged like stripes and an insulating material which is permeable to the reading light L2 and filled in the spaces 8 between the conductive elements 6a.

The current detecting section 102 comprises a number of current detecting amplifiers 21 each connected to one of the electrode elements 6a of the stripe electrode 6, and detects in parallel currents flowing through the electrode elements 6a upon exposure to the reading light L2 element by element. The first electrode layer 2 of the electrostatic recording medium 101 is connected to one of two inputs of a first switch (a two-input, one-output switch) 22 and the negative pole of a power source 23. The positive pole of the power source 23 is connected to the other input of the first switch 22. The output of the first switch 22 is connected to the current detecting amplifiers 21.

The LED array 103 projects a substantially uniform line reading light beam L2 onto the electrostatic recording medium 101 and is held horizontally. The LED array 103 is moved by the scanning section 104 along the surface of the electrostatic recording medium 101 in the longitudinal direction of the electrostatic recording medium 101 (the direction of the arrow), whereby the surface of the electrostatic recording medium 101 is substantially uniformly exposed to the line reading light beam L2.

When the LED array 103 is scanning the electrostatic recording medium 101 with the line reading light beam L2, the scanning detecting means 105 outputs a detecting signal to the buzzer 113 and the movement inhibiting means 114.

The control section 112 of the moving section 110 outputs a drive signal to the screw rod drive motor. The movement inhibiting means 114 is provided with a relay (not shown) and, when receiving the detecting signal from the scanning detecting means 105, operates the relay so that the drive signal is not delivered to the screw rod drive motor, thereby preventing the recording/read-out section 100 from being moved up and down. The buzzer 113 generates sound when it receives the detecting signal from the scanning detecting means 105.

Operation of the radiation image information recording and read-out apparatus of this embodiment will be described, hereinbelow. Recording an electrostatic latent image in the radiation image information recording and read-out apparatus will be described first. The output of the first switch 22 is connected to the power source 23 and a direct voltage is applied between the first electrode layer 2 and the electrode elements 6a of the second electrode layer 7, thereby charging the first and second electrode layers 2 and 7. Thus a U-shaped electric field is formed between the first electrode layer 2 and each of the electrode elements 6a.

Then the object is exposed to X-rays L1 and X-rays passing through the object impinge upon the wavelength conversion layer 1 of the electrostatic recording medium 101. The wavelength conversion layer 1 converts the X-rays into blue light and the blue light impinges upon the recording photoconductive layer 3 through the first electrode layer 2. The photoconductive layer 3 becomes conductive upon exposure to the blue light in a pattern according to the amount of blue light impinging upon each part of the photoconductive layer 3. That is, each part of the recording photoconductive layer 3 acts as a variable resistor whose resistance varies according to the amount of blue light impinging thereupon. The resistance of the part of the recording photoconductive layer 3 depends upon generation of electrons and positive holes upon exposure to the blue light, and as the amount of X-rays passing through the object increases, the resistance of the recording photoconductive layer 3 increases.

The positive charge generated in the recording photoconductive layer 3 moves toward the first electrode layer 2 at high speed and encounters the negative charge of the first conductive layer 2 at the interface of the recording photoconductive layer 3 and the first electrode layer 2 to cancel each other by recombination. The negative charge generated in the recording photoconductive layer 3 moves toward the charge transfer layer 4 and is accumulated at the interface of the recording photoconductive layer 3 and the charge transfer layer 4 since the charge transfer layer 4 acts as an insulator to the charge of the same polarity as that at which the first electrode layer 2 is electrified (negative charge in this particular embodiment). The amount of charge accumulated at the interface depends upon the amount of the negative charge generated in the recording photoconductive layer 3 upon exposure to X-rays L1, that is, the amount of X-rays passing through the object. When an X-ray cut portion impermeable to X-rays exists in the object, the part of the recording photoconductive layer 3 behind the X-ray cut portion is kept unchanged since the part is not exposed to the recording radiation L1.

Thus, an electric charge is accumulated on the interface of the recording photoconductive layer 3 and the charge transfer layer 4 in a pattern corresponding to the X-ray transmittance distribution in the object, that is, a latent radiation image is recorded.

The latent radiation image read-out process in the radiation image recording and read-out apparatus of this embodiment will be described, hereinbelow.

After a latent radiation image is recorded on the electrostatic recording medium 101, the output of the first switch 22 is connected to the first electrode layer 2. Then the LED array 103 starts to scan the electrostatic recording medium 101 with the line reading light beam.

When the LED array 103 is scanning the electrostatic recording medium 101 with the line reading light beam L2, the scanning detecting means 105 outputs a detecting signal to the buzzer 113 and the movement inhibiting means 114. The buzzer 113 generates sound when it receives the detecting signal from the scanning detecting means 105, thereby informing the operator that the LED array 103 is scanning the electrostatic recording medium 101 with the line reading light beam L2. The movement inhibiting means 114 operates the relay so that the drive signal is not delivered to the screw rod drive motor when receiving the detecting signal from the scanning detecting means 105, thereby preventing the recording/read-out section 100 from being moved up and down.

The scanning section 104 moves the LED array 103, which is emitting the line reading light beam L2, at a predetermined speed in the direction of the arrow in FIG. 2. When the line reading light beam L2 impinges upon the reading photoconductive layer 5, the part of the reading photoconductive layer 5 exposed to the line reading light beam L2 becomes conductive and an electric current I flows from the first electrode layer 2 to the electrode element 6a of the second electrode layer 7 through current detecting amplifier 21. The electric current I charges the integrating capacitor 25 and the charge is accumulated in the capacitor 25 according to the amount of the electric current I. That is, the voltage across the capacitor 25 increases according to the amount of the electric current I. Accordingly, when the switch 26 of each detecting amplifier 21 is closed and opened at regular intervals, the voltage across the capacitor 25 changes according to the accumulated charge for each pixel. Accordingly, by reading the change in voltage across each capacitor 25, the latent image recorded on the electrostatic recording medium 101 can be read out.

When scanning of the electrostatic recording medium 101 by the LED array 103 is ended and reading of the latent image is completed, the scanning detecting means 105 stops outputting the detecting signal, whereby the buzzer 113 stops generating the alarm sound and the movement inhibiting means 114 comes to permit the moving mechanism 111 to move the recording/read-out section 100.

Then the operator adjusts the level of the recording/read-out section 100 to conform to the level of the chest of another object by way of the control section 112. Since there remains no accumulated charge on the electrostatic recording medium 101 after the latent image is read out, the step of erasing the electrostatic recording medium 101 is not necessary and the next shot can be made immediately.

In this embodiment where the second electrode layer 7 comprises a plurality of line electrode elements 6a, the pixel pitches in the transverse direction of the electrostatic recording medium 101 depend upon the intervals of the line electrode elements 6a and the pixel pitches in the longitudinal direction of the electrostatic recording medium 101 depend upon the switching intervals of the integrating capacitors 25. Accordingly, when the speed at which the line reading light beam L2 scans the electrostatic recording medium 101 is deviated from a predetermined speed during scanning of the electrostatic recording medium 101, positions of pixels are deviated, which results in generation of artifact. In the radiation image information recording and read-out apparatus of this embodiment, since when the LED array 103 is scanning the electrostatic recording medium 101 with the line reading light beam, the movement inhibiting means 114 inhibits the moving mechanism 111 from moving the recording/read-out section 100, the event that the recording/read-out section 100 is accidentally moved to change the speed at which the line reading light beam L2 scans the electrostatic recording medium 101 can be prevented, whereby generation of artifact can be prevented.

Though, in the first embodiment, both the alarm means (the buzzer 113) and the movement inhibiting means 114 are provided, only one of them may be provided. When only the buzzer 113 is provided, generation of artifact can be prevented only by the operator inhibiting himself from moving the recording/read-out section 100 while the buzzer 113 is operating. When only the movement inhibiting means 114 is provided, unsuccessful attempted operation can be avoided by the operator inhibiting himself from moving the recording/read-out section 100 until scanning of the electrostatic recording medium 101 by the LED array 103 is finished.

Though, in the first embodiment, the movement inhibiting means 114 electrically inhibits movement of the recording/read-out section 100 by use of a relay, the movement inhibiting means 114 may mechanically inhibit movement of the recording/read-out section 100 by use of, for instance, a brake mechanism.

Figure 4:
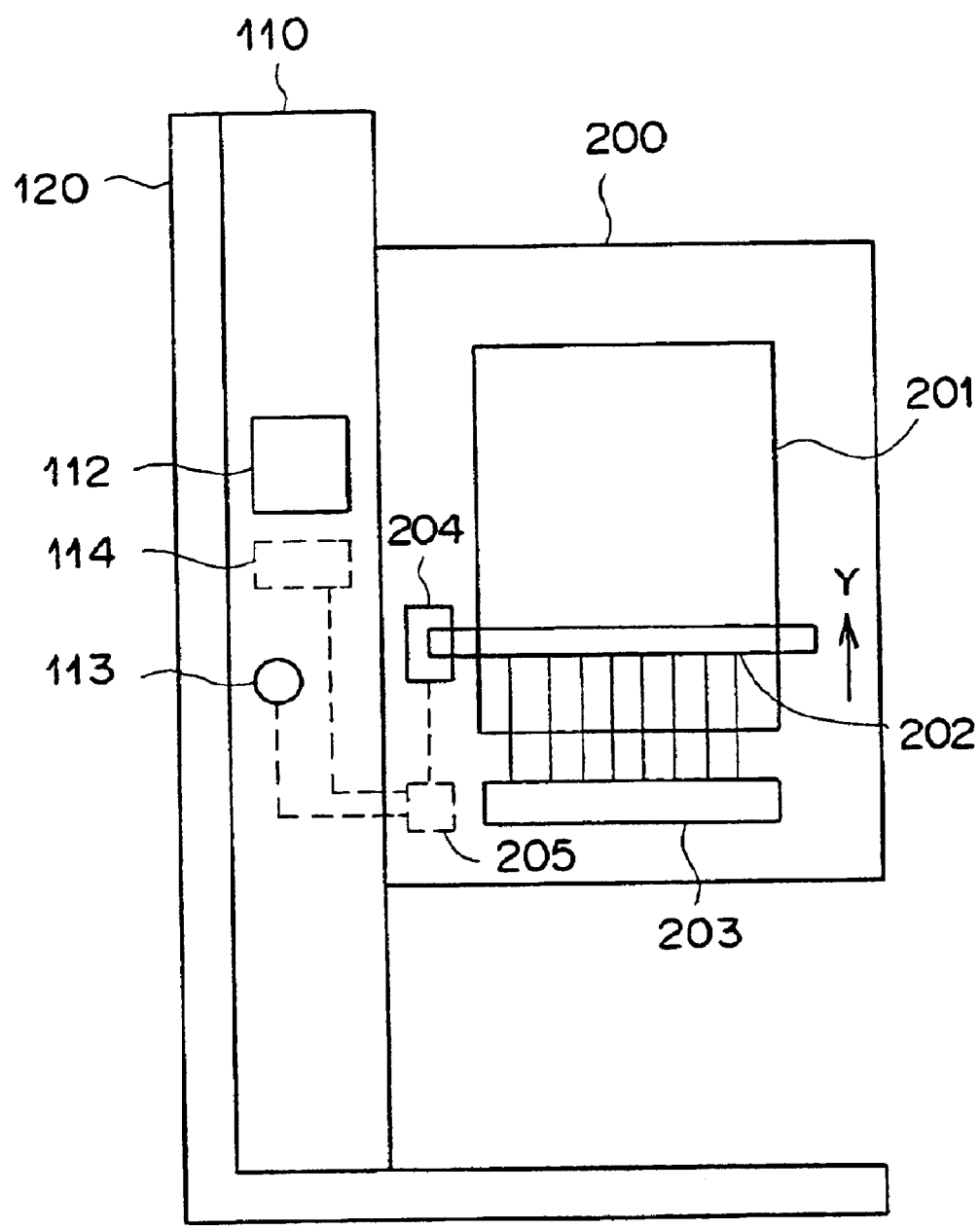
FIG. 4 is a radiation image information recording and read-out apparatus in accordance with a second embodiment of the present invention.

A radiation image information recording and read-out apparatus in accordance with a second embodiment of the present invention will be described with reference to FIGS. 4 and 5, hereinbelow. In FIGS. 4 and 5, the radiation image information recording and read-out apparatus in accordance with the second embodiment of the present invention is for chest radiography and comprises a recording/read-out section 200, a moving section 110, a stand 120 and an x-ray projecting section (not shown). In FIG. 4, the elements analogous to those shown in FIG. 1 are given the same reference numerals and will not be described here. The recording/read-out section 200 is mounted on the stand 120 by way of the moving section 110 to be movable up and down along the stand 120. The operator adjusts the level of the recording/read-out section 200 to conform to the level of the chest of the object.

The recording/read-out section 200 comprises a stimulable phosphor sheet 201, a light source/sensor section 202, a signal processing section 203 connected to the light source/sensor section 202, a scanning section 204 which moves the light source/sensor section 202 to scan the stimulable phosphor sheet 201 with the line reading light beam emitted from the light source/sensor section 202, thereby two-dimensionally exposing the stimulable phosphor sheet 201 to the line reading light beam, and a scanning detecting means 205 which detects that the light source/sensor section 202 is scanning the stimulable phosphor sheet 201 with the line reading light beam.

The light source/sensor section 202 is held horizontally to the stimulable phosphor sheet 201 to extend in perpendicular to the longitudinal direction Y of the stimulable phosphor sheet 201.

As shown in FIG. 5, the light source/sensor section 202 comprises an LED array 30 (a line reading light source) which emits reading light L3 at about 45° to the surface of the stimulable phosphor sheet 201, a lens array 31 which collects the reading light L3 emitted from the LED array 30 and projects the line reading light beam L3 onto the surface of the stimulable phosphor sheet 201, a SELFOC lens array 34 the optical axis of which is at about 45° to the surface of the stimulable phosphor sheet 201 and about 90° to the direction of travel of the line reading light beam L3 and which converges the stimulated emission L4 emitted from the stimulable phosphor sheet 201 upon exposure to the line reading light beam L3 onto the light receiving face of a line sensor 32, a stimulating light cut filter 35 which cuts the reading light L3 in the stimulated emission L4 entering the SELFOC lens array 34, the line sensor 32 which has an array of photoelectric convertor elements 33 which receive the stimulated emission L4 and convert it into an electric image signal and a holder 36 which holds these elements. The output of the line sensor 32 is input into the signal processing section 203.

The SELFOC lens array 34 images a light emitting region of the stimulable phosphor sheet 201 on the light receiving face of the line sensor 32 in a natural size. The photoelectric convertor element 33 of the line sensor 32 is an amorphous selenium sensor in this particular embodiment, though may be an amorphous silicon sensor, a CCD sensor, a MOS sensor or the like.

In this particular embodiment, the stimulable phosphor sheet 201 emits blue light (stimulated emission) near 400 nm upon exposure to reading light L3 not shorter than 600 nm in wavelength.

The amorphous selenium sensor is low in sensitivity to wavelengths not shorter than 600 nm and high in sensitivity to wavelengths not longer than 500 nm.

When the light source/sensor section 202 is scanning the electrostatic recording medium 101 with the line reading light beam L3, the scanning detecting means 205 outputs a detecting signal to the buzzer 113 and the movement inhibiting means 114.

Operation of the radiation image read-out apparatus of this embodiment will be described, hereinbelow. The object is exposed to X-rays L1 and X-rays passing through the object impinge upon the stimulable phosphor sheet 201, whereby radiation energy is stored on the stimulable phosphor sheet 201 in a pattern corresponding to the X-ray transmittance distribution in the object. That is, a radiation image of the object is recorded on the stimulable phosphor sheet 201.

Then the light source/sensor section 202 starts to scan the stimulable phosphor sheet with the line reading light beam L3.

When the light source/sensor section 202 is scanning the stimulable phosphor sheet 201 with the line reading light beam L3, the scanning detecting means 205 outputs a detecting signal to the buzzer 113 and the movement inhibiting means 114. The buzzer 113 generates sound when it receives the detecting signal from the scanning detecting means 205, thereby informing the operator that the light source/sensor section 202 is scanning the stimulable phosphor sheet 201 with the line reading light beam L3. The movement inhibiting means 114 electrically disconnect the control section 112 from the moving mechanism 111 when receiving the detecting signal from the scanning detecting means 205, thereby preventing the light source/sensor section 202 from being moved up and down.

The light source/sensor section 202 is moved in the direction of arrow Y by the scanning section 204 so that the entire area of the stimulable phosphor sheet 201 is exposed to the reading light L3.

The LED array 30 emits a line reading light beam L3 at 45° to the surface of the stimulable phosphor sheet 201. The line reading light beam L3 is collected by the lens array 31 and caused to impinge upon the surface of the stimulable phosphor sheet 201 at about 45° thereto. The line reading light beam L3 irradiates a linear region on the stimulable phosphor sheet 201.

The line reading light beam L3 impinging upon the stimulable phosphor sheet 201 stimulates the stimulable phosphor in the area corresponding to the linear irradiated region and at the same time is scattered inside the stimulable phosphor sheet 210 to stimulate also the stimulable phosphor near the linear irradiated region. As a result, the stimulated emission L4 is emitted from the area corresponding to the linear irradiated region and the area adjacent thereto in proportion to the amount of radiation energy stored thereon. The stimulated emission L4 passes through the stimulating light cut filter 35 and enters the SELFOC lens array 34. Then the stimulated emission L4 is converged onto the light receiving faces of photoelectric convert or elements 33. The reading light L3 reflected by the surface of the stimulable phosphor sheet 210 is cut by the stimulating light cut filter 35.

The photoelectric convertor elements 33 convert the stimulated emission L4 into an electric signal and output the electric signal to the signal processing section 203. The signal processing section 203 carries out predetermined processing on the electric signal and the processed electric signal is output to an external image processing apparatus not shown.

When scanning of the stimulable phosphor sheet 201 by the light source/sensor section 202 is ended and reading of the radiation image is completed, the scanning detecting means 205 stops outputting the detecting signal, whereby the buzzer 113 stops generating the alarm sound and the movement inhibiting means 114 electrically connects the control section 112 to the moving mechanism 111 to permit the moving mechanism 111 to move the light source/sensor section 202.

Then the operator adjusts the level of the recording/read-out section 200 to conform to the level of the chest of another object by way of the control section 112. Since the stimulable phosphor sheet 201 holds residual radiation energy even after exposed to the reading light L3, the residual radiation energy must be released by exposing the stimulable phosphor sheet 201 to erasing light.

In this embodiment where the line sensor 32 comprises a plurality of photoelectric convertor elements 33, the pixel pitches in the transverse direction of the stimulable phosphor sheet 201 depend upon the intervals of the photoelectric convertor elements 33 and the pixel pitches in the longitudinal direction of the stimulable phosphor sheet 201 depend upon the timing at which signals are read out from the photoelectric convertor elements 33. Accordingly, when the speed at which the light source/sensor section 202 scans the stimulable phosphor sheet 201 is deviated from a predetermined speed during scanning of the stimulable phosphor sheet 201, positions of pixels are shifted, which results in generation of artifact. In the radiation image information recording and read-out apparatus of this embodiment, since when the light source/sensor section 202 is scanning the stimulable phosphor sheet 201 with the line reading light beam, the movement inhibiting means 114 inhibits the moving mechanism 111 from moving the recording/read-out section 200, the event that the light source/sensor section 202 is accidentally moved to change the speed at which the line reading light beam L3 scans the stimulable phosphor sheet 201 can be prevented, whereby generation of artifact can be prevented.

Though, in the second embodiment, an LED array is employed as the line reading light source, a broad area laser, a fluorescent lamp, an organic EL, an LD array or the like may be employed in place of the LED array so long as it can emit a line reading light beam.

Further, it is not necessary to simultaneously operate LEDs in the LED array but the LEDs in the LED array may be operated in sequence. In this case, after all the LEDs in the LED array are operated, the light source/sensor section 202 is moved to the next scanning line and then the LEDs in the LED array are operated in sequence again.

A radiation image information recording and read-out apparatus in accordance with a third embodiment of the present invention will be described with reference to FIG. 6, hereinbelow. In FIG. 6, the radiation image information recording and read-out apparatus in accordance with the third embodiment of the present invention is for chest radiography and comprises a recording/read-out section 300, a moving means 310, a stand 120 and an X-ray projecting section (not shown). In FIG. 6, the elements analogous to those shown in FIG. 1 are given the same reference numerals and will not be described here. The recording/read-out section 300 is mounted on the stand 120 by way of the moving means 310 to be movable up and down along the stand 120. The operator adjusts the level of the recording/read-out section 300 to conform to the level of the chest of the object.

The recording/read-out section 300 comprises an electrostatic recording medium 301 in the form of a flat panel, a current detecting section 302 which reads out image information as an electric current pattern, an LED array 303 which emits a line reading light beam, and a scanning section 304 which moves the LED array 303 in the direction of the arrow substantially perpendicular to the longitudinal direction of the LED array 303, thereby two-dimensionally exposing the electrostatic recording medium 301 to the line reading light beam.

The moving means 310 comprises a moving mechanism 111 and a control section 112.

According to the setting effected by the operator through the control section 112, the moving mechanism 111 moves up and down the recording/read-out section 300.

The electrostatic recording medium 301 of this embodiment is substantially the same as the electrostatic recording medium 101 of the first embodiment except that the aspect ratio of the electrostatic recording medium 301 is different from that of the electrostatic recording medium 101 and the electrostatic recording medium 301 is rotated by 90° in position with respect to the electrostatic recording medium 101. The current detecting section 302 is the same as the current detecting section 102 of the first embodiment in arrangement and operation.

Operation of the third embodiment will be described, hereinbelow. In the same manner as in the first embodiment, a latent radiation image is recorded on the electrostatic recording medium 301. Then the LED array 303 is moved at a predetermined speed in the horizontal direction as shown by the arrow in FIG. 6.

Since the LED array 303 is moved in the horizontal direction, movement of the recording/read-out section 300 hardly affects the movement of the LED array 303. Accordingly, the operator can adjust the level of the recording/read-out section 300 to conform to the level of the chest of another object even while reading of the latent radiation image is being carried out, whereby the effective time required for one shot can be shortened, the load on both the operator and the object can be lightened and the working efficiency of the image read-out apparatus can be increased.

Figure 7:
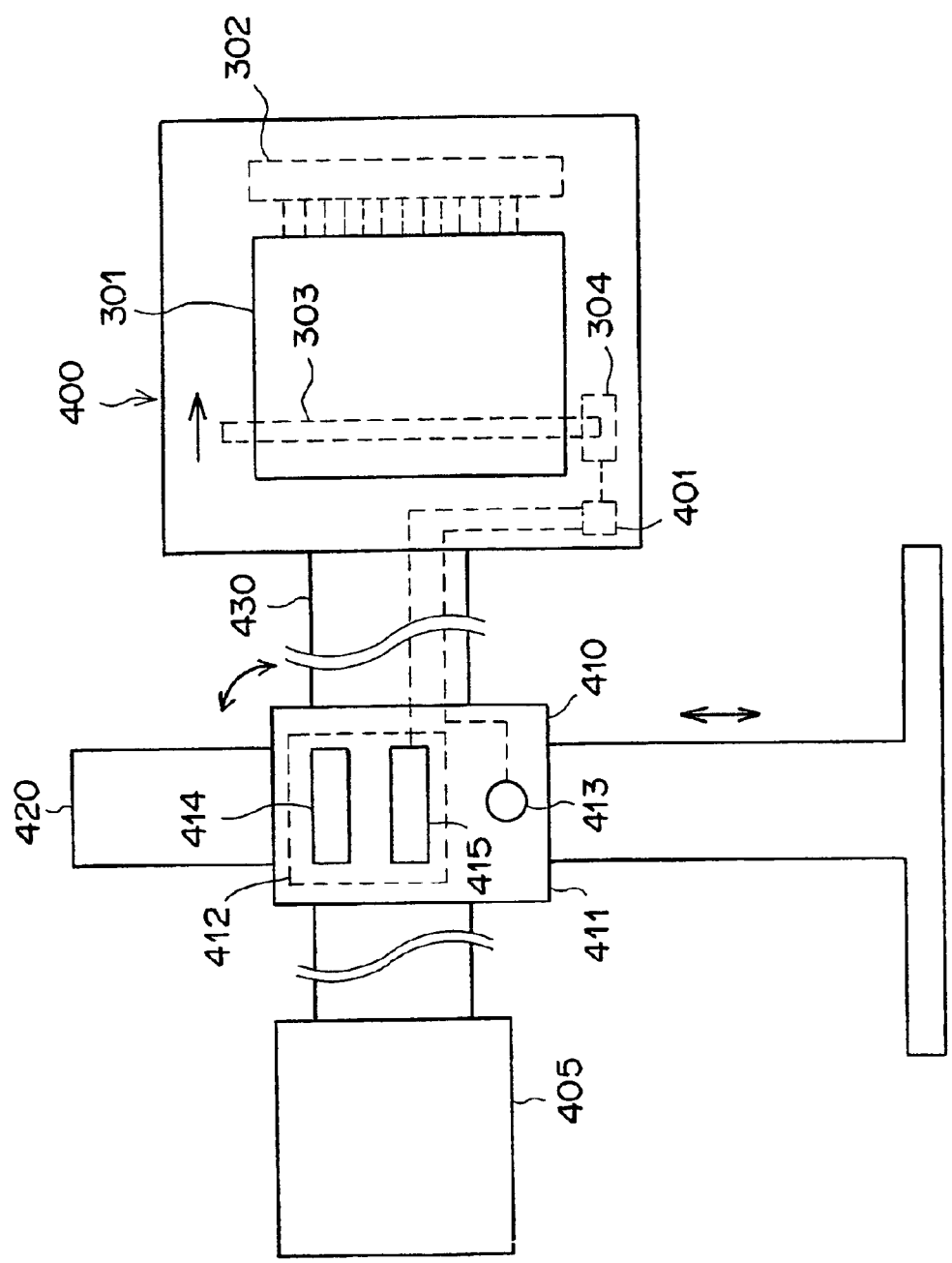
FIG. 7 is a radiation image information recording and read-out apparatus in accordance with a fourth embodiment of the present invention.

A radiation image information recording and read-out apparatus in accordance with a fourth embodiment of the present invention will be described with reference to FIG. 7, hereinbelow. In FIG. 7, the radiation image information recording and read-out apparatus in accordance with the fourth embodiment of the present invention is for chest radiography and comprises a recording/read-out section 400, an X-ray projecting section 405, a moving means 410, a stand 420 and a U-shaped arm 430 connecting the recording/read-out section 400 and the X-ray projecting section 405. The recording/read-out section 400 and the X-ray projecting section 405 are supported opposed to each other by the U-shaped arm 430. The U-shaped arm 430 is mounted on the stand 420 by way of the moving means 410 at its bight portion to be movable up and down along the stand 420 and to be able to be inclined with respect to the stand 420. In FIG. 7, the elements analogous to those shown in FIG. 6 are given the same reference numerals and will not be described here. The recording/read-out section 400 is connected to the U-shaped arm 430 so that the plane on which the arm 430 is bent is normal to the plane including the surface of the electrostatic recording medium 301. The operator adjusts the position of the recording/read-out section 400 and the X-ray projection section 405 to conform to the level of the part to be radiographed and the angle of radiographing.

The recording/read-out section 400 comprises an electrostatic recording medium 301, a current detecting section 302, an LED array 303, a scanning section 304 which moves the LED array 303 in the scanning direction, and a scanning detecting means 401 which detects that the LED array 303 is scanning the electrostatic recording medium 301 with the line reading light beam.

The moving section 410 comprises a moving mechanism 411 which moves the U-shaped arm 430, a control section 412 which controls the moving mechanism 411, and a buzzer 413 which informs the operator that the LED array 303 is scanning the electrostatic recording medium 301 with the line reading light beam. The control section 412 comprises a control panel 414 and a movement direction limiting means 415 which limits the direction of movement of the recording/read-out section 400 and the X-ray projecting section 405. According to the setting effected by the operator through the control panel 414, the control section 412 causes the moving mechanism 411 to move the U-shaped arm 430 at a predetermined speed to bring the recording/read-out section 400 and the X-ray projecting section 405 to the set position.

When the LED array 303 is scanning the electrostatic recording medium 301 with the line reading light beam, the scanning detecting means 401 outputs a detecting signal to the buzzer 413 and the movement direction limiting means 415.

While receiving the detecting signal, the movement direction limiting means 415 limits the direction of movement of the U-shaped arm 430 to only directions substantially perpendicular to the scanning direction of the LED array 303.

Operation of the fourth embodiment will be described, hereinbelow. In the same manner as in the first embodiment, a latent radiation image is recorded on the electrostatic recording medium 301. Then the LED array 303 is moved at a predetermined speed in the horizontal direction as shown by the arrow in FIG. 7.

When the LED array 303 is scanning the electrostatic recording medium 301 with the line reading light beam, the scanning detecting means 401 outputs a detecting signal to the buzzer 413 and the movement direction limiting means 415.

The buzzer 413 generates sound when it receives the detecting signal from the scanning detecting means 401, thereby informing the operator that the LED array 303 is scanning the electrostatic recording medium 301 with the line reading light beam.

The movement direction limiting means 415 inhibits the control section 412 from moving the U-shaped arm 430 in directions other than directions substantially perpendicular to the scanning direction of the LED array 303, when receiving the detecting signal from the scanning detecting means 401. For example, when the U-shaped arm 430 is held horizontally, the movement direction limiting means 415 permits the control section 412 to move only in the vertical direction.

When scanning of the electrostatic recording medium 301 by the LED array 303 is ended and reading of the latent image is completed, the scanning detecting means 401 stops outputting the detecting signal, whereby the buzzer 113 stops generating the alarm sound and the movement direction limiting means 415 comes to permit the moving mechanism 111 to move the recording/read-out section 400 in any direction.

As can be understood from the description above, the recording/read-out section 400 is permitted to be moved only in directions substantially perpendicular to the scanning direction of the LED array 303 while the LED array 303 is scanning the electrostatic recording medium 301. As a result, generation of artifact can be prevented, and at the same time, since setting for another shot can be partly carried out while the image is being read out, the effective time required for one shot can be shortened, the load on both the operator and the object can be lightened and the working efficiency of the image read-out apparatus can be increased.

Figure 8:
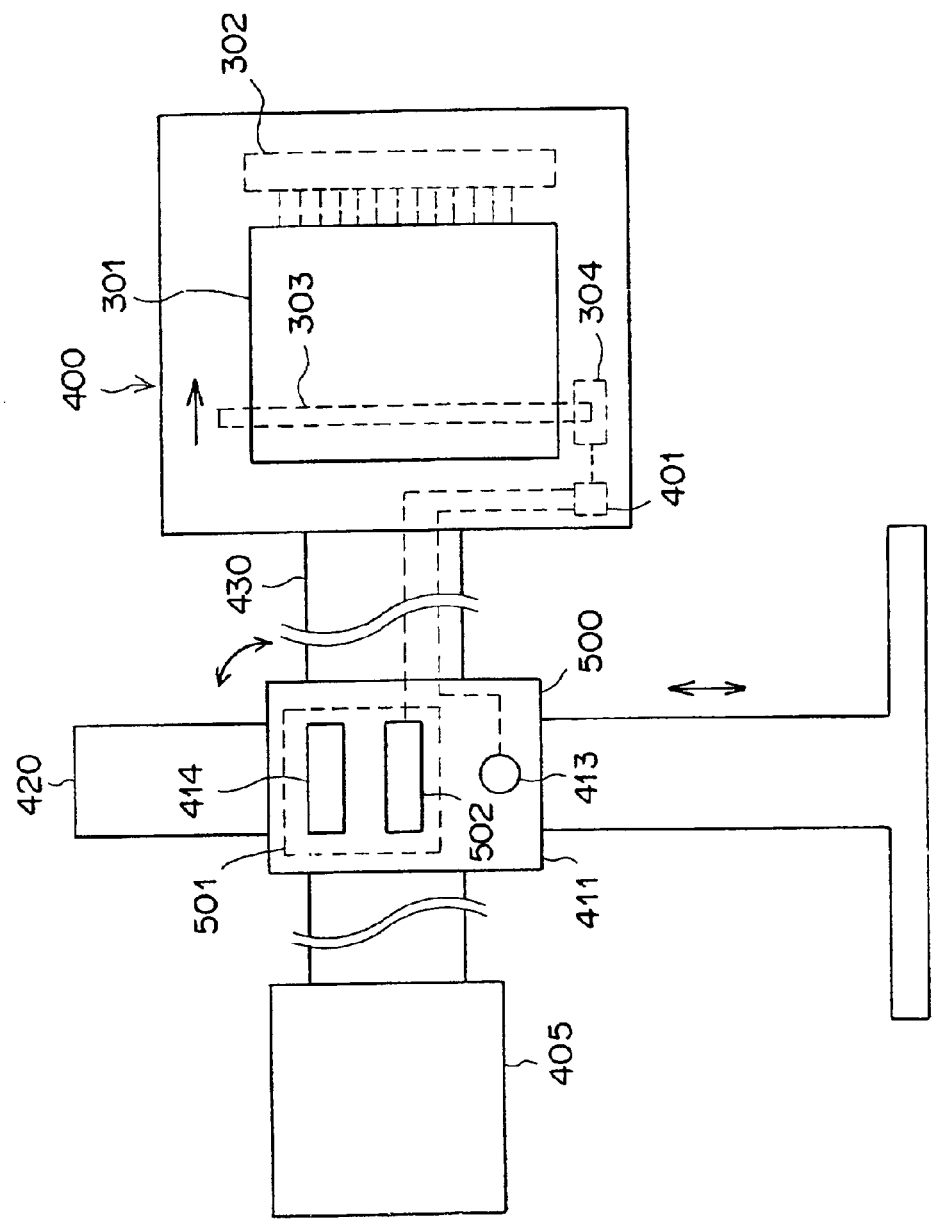
FIG. 8 is a radiation image information recording and read-out apparatus in accordance with a fifth embodiment of the present invention.

A radiation image information recording and read-out apparatus in accordance with a fifth embodiment of the present invention will be described with reference to FIG. 8, hereinbelow. In FIG. 8, the elements analogous to those shown in FIG. 8 are given the same reference numerals and will not be described here. In FIG. 8, the radiation image information recording and read-out apparatus in accordance with the fifth embodiment of the present invention comprises a recording/read-out section 400, an X-ray projecting section 405, a moving means 500, a stand 420 and a U-shaped arm 430 connecting the recording/read-out section 400 and the X-ray projecting section 405.

The moving section 500 comprises a moving mechanism 411 which moves the U-shaped arm 430, a control section 501 which controls the moving mechanism 411, and a buzzer 413 which informs the operator that the LED array 303 is scanning the electrostatic recording medium 301 with the line reading light beam. The control section 501 comprises a control panel 414 and a movement limiting means 502 which limits the direction of movement and the acceleration of movement of the U-shaped arm 430, that is, of the recording/read-out section 400 and the X-ray projecting section 405.

While receiving the detecting signal, the movement limiting means 502 limits the direction of movement and the acceleration of movement of the U-shaped arm 430 so that force F acting on the LED array 303 in the scanning direction thereof becomes not larger than 10 Kgm/s$^2$, wherein the force F is represented by the product of the mass m of the LED array 303 (has been stored) and an acceleration a acting in the scanning. The mass m of the LED array 303 is preferred to be as small as possible in order to lighten the limitation on the movement of the U-shaped arm 430 and is preferably not larger than 1 Kg.

Operation of the fifth embodiment will be described, hereinbelow. In the same manner as in the first embodiment, a latent radiation image is recorded on the electrostatic recording medium 301. Then the LED array 303 is moved at a predetermined speed in the horizontal direction as shown by the arrow in FIG. 8.

When the LED array 303 is scanning the electrostatic recording medium 301 with the line reading light beam, the scanning detecting means 401 outputs a detecting signal to the buzzer 413 and the movement limiting means 502.

The buzzer 413 generates sound when it receives the detecting signal from the scanning detecting means 401, thereby informing the operator that the LED array 303 is scanning the electrostatic recording medium 301 with the line reading light beam.

The movement limiting means 502 limits the direction of movement and the acceleration of movement of the U-shaped arm 430 so that force F acting on the LED array 303 in the scanning direction thereof becomes not larger than 10 Kgm/s$^2$ when receiving the detecting signal from the scanning detecting means 401.

When scanning of the electrostatic recording medium 301 by the LED array 303 is ended and reading of the latent image is completed, the scanning detecting means 401 stops outputting the detecting signal, whereby the buzzer 113 stops generating the alarm sound and the movement limiting means 502 comes to permit the moving mechanism 111 to move the recording/read-out section 400 in any manner.

As can be understood from the description above, in the fifth embodiment, the direction of movement and the acceleration of movement of the U-shaped arm 430 are limited so that a large force does not act on the LED array 303 while the LED array 303 is scanning the electrostatic recording medium 301. As a result, generation of artifact can be prevented, and at the same time, since setting for another shot can be carried out while the image is being read out though somewhat limited, the effective time required for one shot can be shortened, the load on both the operator and the object can be lightened and the working efficiency of the image read-out apparatus can be increased.

When the movement limiting means 502 limits the direction of movement and/or the acceleration of movement of the U-shaped arm so that force F acting on the line reading light source in the direction of scanning of the electrostatic recording medium 301 with the line reading light beam becomes not larger than 3 Kgm/s$^2$, generation of artifact can be more surely prevented and the reliability of the image information read-out apparatus can be improved.

Though, in the embodiments described, the electrostatic recording medium and the stimulable phosphor sheet of a particular type are employed, the present invention can be applied to various recording media so long as a reading light beam is caused to scan the recording medium when reading out an image. For example, an electrostatic recording medium which is not provided with a wavelength conversion layer 1 and directly converts a radiation into an electrostatic charge may be employed.

Further, it is not necessary to simultaneously operate LEDs in the LED array but the LEDs in the LED array maybe operated in sequence. In this case, after all the LEDs in the LED array are operated, the LED array is moved to the next scanning line and then the LEDs in the LED array are operated in sequence again. This arrangement is advantageous in that the second electrode layer 7 need not be a stripe electrode and only one current detecting amplifier is required though the scanning time is increased.

The line reading light source may comprise an LD array in place of the LED array. Further, line reading light source may comprise a plurality of LED chips or LD chips arranged in at least one row. In this case, the chips can be replaced chip by chip in the case of failure, which reduces the maintenance cost.

What is claimed is:

1. An image information read-out apparatus comprising an image read-out means which is provided with a line reading light source for scanning a recording medium with a line reading light beam and reads out image information from the recording medium in response to the line reading light source scanning the recording medium, and an image read-out means moving means which moves the image read-out means inclusive of the recording medium and the line reading light source, wherein the improvement comprises a scanning detecting means which detects that the line reading light source is scanning the recording medium with the line reading light beam, and an alarm means which informs the operator that the line reading light source is scanning the recording medium with the line reading light beam when the scanning detecting means detects the fact.

2. An image information read-out apparatus as defined in claim 1 in which the recording medium is an electrostatic recording medium having at least one photoconductive material layer.

3. An image information read-out apparatus as defined in claim 1 in which the recording medium comprises a stimulable phosphor layer.

4. An image information read-out apparatus as defined in claim 1 in which the line reading light source comprises a plurality of LED chips or LD chips arranged in at least one row.

5. An image information read-out apparatus as defined in claim 1 in which the line reading light source comprises at least one LED array or LD array.

6. An image information read-out apparatus comprising an image read-out means which is provided with a line reading light source for scanning a recording medium with a line reading light beam and reads out image information from the recording medium in response to the line reading light source scanning the recording medium, and an image read-out means moving means which moves the image read-out means inclusive of the recording medium and the line reading light source, wherein the improvement comprises a scanning detecting means which detects that the line reading light source is scanning the recording medium with the line reading light beam, and a movement inhibiting means which inhibits the image read-out means moving means from moving the read-out means when the scanning detecting means detects that the line reading light source is scanning the recording medium with the line reading light beam.

7. An image information read-out apparatus as defined in claim 6 in which the recording medium is an electrostatic recording medium having at least one photoconductive material layer.

8. An image information read-out apparatus as defined in claim 6 in which the recording medium comprises a stimulable phosphor layer.

9. An image information read-out apparatus as defined in claim 6 in which the line reading light source comprises a plurality of LED chips or LD chips arranged in at least one row.

10. An image information read-out apparatus as defined in claim 6 in which the line reading light source comprises at least one LED array or LD array.

11. An image information read-out apparatus comprising an image read-out means which is provided with a line reading light source for scanning a recording medium with a line reading light beam and reads out image information from the recording medium in response to the line reading out scanning the recording medium, and an image read-out means moving means which moves in a predetermined direction the image read-out means inclusive of the recording medium and the line reading light source, wherein the improvement comprises that the line reading light source scans the recording medium with the line reading light beam in a direction substantially perpendicular to said predetermined direction in which the image read-out means moving means moves the image read-out means.

12. An image information read-out apparatus as defined in claim 11 in which the recording medium is an electrostatic recording medium having at least one photoconductive material layer.

13. An image information read-out apparatus as defined in claim 11 in which the recording medium comprises a stimulable phosphor layer.

14. An image information read-out apparatus as defined in claim 11 in which the line reading light source comprises a plurality of LED chips or LD chips arranged in at least one row.

15. An image information read-out apparatus as defined in claim 11 in which the line reading light source comprises at least one LED array or LD array.

16. An image information read-out apparatus comprising an image read-out means which is provided with a line reading light source for scanning a recording medium with a line reading light beam and reads out image information from the recording medium in response to the line reading light source scanning the recording medium, and an image read-out means moving means which moves the image read-out means inclusive of the recording medium and the line reading light source, wherein the improvement comprises a scanning detecting means which detects that the line reading light source is scanning the recording medium with the line reading light beam, and a movement direction limiting means which limits the direction of movement of the image read-out means by the image read-out means moving means to directions substantially perpendicular to the direction in which the line reading light source scans the recording medium with the line reading light beam when the scanning detecting means detects that the line reading light source is scanning the recording medium with the line reading light beam.

17. An image information read-out apparatus as defined in claim 16 in which the recording medium is an electrostatic recording medium having at least one photoconductive material layer.

18. An image information read-out apparatus as defined in claim 16 in which the recording medium comprises a stimulable phosphor layer.

19. An image information read-out apparatus as defined in claim 16 in which the line reading light source comprises a plurality of LED chips or LD chips arranged in at least one row.

20. An image information read-out apparatus as defined in claim 16 in which the line reading light source comprises at least one LED array or LD array.

21. An image information read-out apparatus comprising an image read-out means which is provided with a line reading light source for scanning a recording medium with a line reading light beam and reads out image information from the recording medium in response to the line reading light source scanning the recording medium, and an image read-out means moving means which moves the image read-out means inclusive of the recording medium and the line reading light source, wherein the improvement comprises a scanning detecting means which detects that the line reading light source is scanning the recording medium with the line reading light beam, and a movement limiting means which limits, when the scanning detecting means detects that the line reading light source is scanning the recording medium with the line reading light beam, the direction of movement and/or the acceleration of movement of the image read-out means by the image read-out means moving means so that force F acting on the line reading light source in the direction of scanning of the recording medium with the line reading light beam becomes not larger than 10 $Kgm/s^2$, wherein the force F is represented by the product of a mass $\underline{m}$ of the line reading light source and an acceleration $\underline{a}$ acting in the direction of scanning of the recording medium with the line reading light beam.

22. An image information read-out apparatus as defined in claim 21 in which the movement limiting means limits, when the scanning detecting means detects that the line reading light source is scanning the recording medium with the line reading light beam, the direction of movement and/or the acceleration of movement of the read-out means by the image read-out means moving means so that force F acting on the line reading light source in the direction of scanning of the recording medium with the line reading light beam becomes not larger than 3 $Kgm/s^2$.

23. An image information read-out apparatus as defined in claim 21 in which the recording medium is an electrostatic recording medium having at least one photoconductive material layer.

24. An image information read-out apparatus as defined in claim 21 in which the recording medium comprises a stimulable phosphor layer.

25. An image information read-out apparatus as defined in claim 21 in which the line reading light source comprises a plurality of LED chips or LD chips arranged in at least one row.

26. An image information read-out apparatus as defined in claim 21 in which the line reading light source comprises at least one LED array or LD array.

27. An image information read-out apparatus as defined in claim 21 in which the line reading light source is not larger than 1 Kg in mass $\underline{m}$.

* * * * *